Patented Feb. 17, 1953

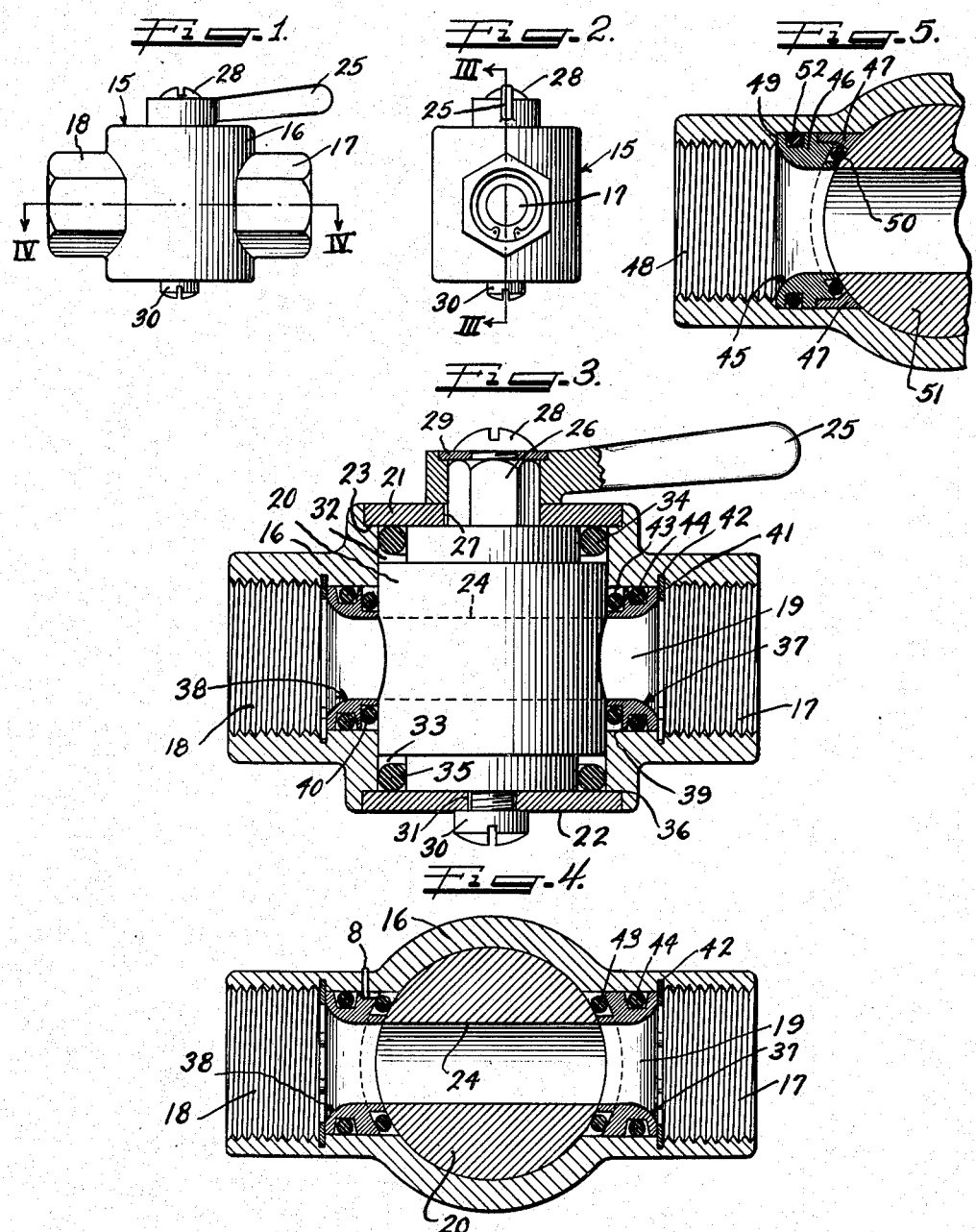

2,628,809

UNITED STATES PATENT OFFICE 2,628,809

SEAT FOR ROTARY PLUG VALVE

Peter Lawrence Mikeska, Chicago, Ill., assignor to The Dole Valve Company, Chicago, Ill., a corporation of Illinois Application February 26, 1945, Serial No. 579,795

6 Claims. (Cl. 251—103)

The present invention relates to a valve. More particularly, the invention concerns a valve structure embodying a sealing means formed of moldable non-metallic plastic material which cooperates with at least one of the ports in the valve chamber to prevent leakage between the valve body and the valve chamber.

It is an object of the present invention to provide a valve which is simple and economical to manufacture and yet insures a completely leakproof structure.

It is a further object of the present invention to provide a valve structure embodying a preformed sealing means which surrounds at least one of the ports of said valve and cooperates with the body and the chamber to prevent leakage therebetween.

It is also an object of the present invention to provide a valve in which such sealing means is associated with the chamber for cooperation with the valve body.

It is a further object of the present invention to provide a valve chamber with which a sealing means is associated in complementary relation.

It is a still further object of the present invention to provide a preformed gasket or sealing means of moldable synthetic plastic material which possesses a configuration adapted to complement the form of the valve element with which it is associated.

In accordance with the general features of the present invention there is provided a valve structure which comprises a chamber having a plurality of fluid ports, a body adjustably disposed within said chamber for opening and closing said ports, and means cooperating with said body and said chamber for sealing at least one of the fluid ports so as to prevent leakage between the body and the chamber of the valve structure.

The novel features which I believe to be characteristic of my invention are set forth with particularity in the appended claims. My invention itself, however, both as to its organization, method of operation and manner of construction, together with further objects and advantages thereof, may best be understood by reference to the accompanying drawings, in which:

Figure 1 represents an elevation of a typical valve structure embodying the principles of the present invention;

Figure 2 is an end elevation of the valve structure of Figure 1;

Figure 3 is a vertical section at a somewhat larger scale as seen from the line III—III of Figure 2 with parts in elevation;

Figure 4 is a horizontal section of the valve unit of Figure 3 as seen from the line IV—IV of Figure 1; and Figure 5 is a partial horizontal section of a modified form of valve.

Figures 1 to 4 inclusive of the drawings illustrate one embodiment of the present invention. The valve unit 15 comprises a suitable valve housing, such as a casting 16 which is provided with a plurality of inlet and outlet ports, in this case an inlet 17 and an outlet 18 which may be internally threaded or provided with other suitable coupling means for connecting pipes or other suitable forms of conduits thereto. As will be seen from Figure 3 of the drawings, casting 16 has formed therein a chamber 19 housing the valve body such, for example, as the plug 20, and is closed at the top and bottom thereof by the plates 21 and 22 which are supported by the shoulders 23 and 36, respectively, in said casting 16.

The plug 20, which is generally cylindrical in shape, is provided with a horizontally extending passageway 24 adapted to communicate with the inlet 17 and outlet 18 in the casting 16 when the valve is opened. The plug 20 is rotatably mounted about its vertical axis and is capable of being adjusted by means of a handle 25 which is secured to a stud 26 of octagonal shape formed on one end of the plug 20 so as to project through an opening 27 in the upper plate 21. The handle 25 is secured to the stud 26 by means of the bolt 28 and the countersunk washer 29. It will be understood that the handle 25 may also serve to hold the upper plate 21 against the shoulder 23. In like manner, a bolt 30 which extends through aperture 31 in lower plate 22 and is threaded into the end of the plug 20 opposite to that upon which the handle 25 is mounted, serves to position the lower plate 22 against the shoulder 36 and also to position the plug 20 in pivotal relation within the chamber 19.

In order to prevent the escape from the chamber 19 of the fluid for the control of which the valve is designed, an annular shoulder 32 is formed on that end of the plug 20 adjacent the mounting of the handle 25, and cooperates with a suitable packing ring 34 to seal the upper end of the valve. A similar annular shoulder 33 and cooperating packing ring 35 is provided at the opposite end of the plug 20 to assist in guarding against the possibility of leakage of fluid at the lower plate 22. In order to increase the sealing effect of packing rings 34 and 35, they are made somewhat oversize and are compressed and deformed when inserted in place so as to assume a flattened O or egg-shaped cross-section, with the flat surfaces thereof abutting against the confronting cylindrical surfaces of casting 16 and plug 20.

To provide additional protection against the possibility of leakage of the fluid from the valve when the plug 20 is adjusted to its closed position in which the axis of the passageway 24 in the plug 20 is substantially at right angles with the longitudinal axis of the valve extending from the inlet 17 to the outlet 18, a suitable means may be provided in said plug 20 to seal the inlet port 17 and outlet port 18.

As shown in Figures 3 and 4 of the drawing, this sealing means may advantageously take the form of assemblies or loading units 37 and 38. Since these assemblies are identical in structure, a description of one of them, namely 37, is deemed to suffice for the purpose of a clear understanding of the invention.

Assembly 37 can be introduced through inlet 17 and seated in the bore 39. The assembly 37 is held in place by means of a split ring or snap washer 41 comprising essentially a metallic ring with a small gap therein to allow a radially inward compression of the ring to a smaller diameter when inserted through inlet 17 to tension it so that it will create a radially outward expansive force while located in the groove 42 in casting 16.

Assembly 37 is provided with a pair of radially outwardly extending flanges providing circular grooves for holding sealing rings 43 and 44, which rings are sometimes referred to in the art as "O-rings." These rings are provided for the purpose of preventing leakage along the inner surface of casting 16. Rings 43 and 44 may be formed of a suitable moldable, non-metallic plastic material such, for example, as rubber, neoprene, or other like substances.

Molded rubber is a specially suitable material for making the sealing rings because in normal use these rings will be frequently worked so that they may be expected to retain their resilience and pliability for a relatively long period of time.

In order to increase the effectiveness of the seal, rings 43 and 44 are preferably made oversize and installed under compression so as to become deformed when in place and assume a flattened O or egg-shaped cross-section, with the flat surfaces of ring 43 abutting against the central radial flange of assembly 37 and the cylindrical surface of plug 20, and with the flat surfaces of ring 44 abutting against the bore 39 and the bottom of the groove in assembly 37. Ring 43 has a rolling action; or else first a rolling and then a sliding action; on the cylindrical surface of the plug 20 as the plug is turned to open or close the valve, thereby "working" the ring, reducing wear thereof due to friction, and increasing the effectiveness of the seal.

The sealing assembly 37 embodies the feature of increasing its sealing effect in proportion to increases in fluid pressure in the valve. Assuming plug 20 is in the closed position, as the pressure of the fluid at inlet 17 increases, the laterally extending annular shank portion of assembly 37 supporting sealing ring 43 expands radially outwardly thereby compressing sealing ring 43 between it and the surface of bore 39, thus increasing the sealing effect. At the same time, due to the riding of sealing ring 43 along the cylindrical surface of plug 20, the assembly 37 is pushed against the snap washer 41, thus compressing both sealing rings 43 and 44 essentially between the radially outward extending ribs of loading unit 37. Likewise, an increase in pressure exerts a radially outward force on the internal surface of assembly 37 as well as a longitudinal force on the snap washer 41, thereby squeezing ring 44 between the adjacent flanges and exerting an increasingly greater sealing effect with respect to bore 39. Hence the action of the assembly or loading unit 37 is to insure against leakage in the valve structure, particularly with exceedingly high pressures.

It will be readily understood that the material employed in the fabrication of the sealing rings in the valve assembly must necessarily be chosen with respect to the character of the fluid to be handled by the valve. For instance, a different material may be required for a valve intended to handle natural gas from that of a valve intended to control the flow of water, oil or similar liquids.

Another embodiment of the present invention is illustrated in Figure 5, in which sealing means of the type contemplated in the present invention is in the form of a composite assembly or loading unit 45 comprising a circularly grooved ring 46 and an annular sleeve 47. Adjacent the internally threaded port 48 is a shoulder 49 for abutting one side of ring 46 to restrain it from lateral movement towards the left.

Ring 52 is also installed under compression in the same manner as ring 44 in Figure 3 so as to assume a flattened O cross-section with the flat sides thereof abutting against the cylindrical surface of casting 16 and the bottom of the groove in ring 46.

Since the external diameter of assembly 45 is greater than the diameter of the threaded port 48, the assembly 45 may be introduced only through the cylindrical bore that accommodates plug 51. In other words, assembly 45 must be introduced through the top or bottom of casting 16 before plug 51 and the remainder of the valve is assembled.

Sealing ring 50 rides on the cylindrical surface of plug 51, thus providing a seal between the assembly 45 and plug 51. Sealing ring 50 is also installed under compression so as to normally assume a flattened O-shaped cross-section. The flat surfaces of ring 50 abut the cylindrical surfaces of ring 46 and plug 51. Sleeve 47 keeps sealing ring 50 in place at the time that the lubricated plug 51 is installed, and acts as a part of the loading unit 45. As the fluid pressure increases, the longitudinally extending circular shank portion of ring 46 encircled by ring 50 exerts a radially outward pressure, thereby compressing sealing ring 50 between it and sleeve 47. Sealing ring 52 functions essentially in the same manner as sealing ring 44 shown in Figure 3, for preventing leakage along the internal surface adjacent inlet 48 and leading to the interior bore of the casting cooperating with plug 51.

The sealing assemblies in either the embodiment shown in Figures 3 and 4 or the modified embodiment shown in Figure 5 may be allowed to float in a circular direction in most cases. However, if it is desired to prevent relative movement between the assembly and the internal bore of the casting 16, a keying or indexing means may be provided such, for example, as a centering or guide pin 8, (see Figure 4).

While the embodiments illustrated in the drawing show only a single inlet and a single outlet, it will be readily apparent that a plurality of sealing assemblies, such as illustrated, may be used in valves having a plurality of inlets and/or outlets; that is, one assembly associated with each port. It will also be understood that a single sealing assembly or loading unit may be employed, such, for example, as in connection with the inlet port only, or the outlet port only.

While I have shown a particular embodiment of my invention, it will, of course, be understood that I do not wish to be limited thereto, since many modifications may be made, and I therefore, contemplate by the appended claims to cover all such modifications as fall within the true spirit and scope of my invention.

I claim as my invention:

1. In a valve structure, a casing having a plurality of ports therein, a plug rotatably journaled in said casing for opening and closing said ports, a ring disposed in each of said ports having a side face in contact with said plug, a recessed portion at the outer peripheral edge of said side face, an annular groove spaced from said recessed portion and a flared throat area adjacent the opening of said ports, a first seal ring disposed in said recessed portion in sealing engagement with said plug, a second seal ring disposed in said annular groove in sealing engagement with said casing and a split ring disposed in a groove in said casing abutting a side face of said ring, the other side face of said ring closely fitting the surface of said plug.

2. In a valve structure, a casing having a plurality of ports connected by a central longitudinal passage and having a pair of circular apertures aligned laterally of said casing, a plug journaled for rotation in said apertures having a reduced diameter portion at either end thereof, a passage through said plug permitting flow of fluid between said ports, a ring disposed in each of said ports having a side face in contact with said plug, a recessed portion at the outer peripheral edge of said side face, an annular groove spaced from said recessed portion and a flared throat area adjacent the opening of said port, a first seal ring disposed in said recessed portion in sealing engagement with said plug and with said casing, a second seal ring disposed in said annular groove in sealing engagement with said casing and a third seal ring at each end of said plug disposed in sealing engagement between said reduced portions of said plug and said casing.

3. In a valve structure, a casing having a plurality of ports, a cylindrical plug valve journaled in said casing for opening and closing said ports, a first seal ring disposed in each of said ports, a retaining member disposed about said first seal ring in each of said ports to urge said first seal rings into sealing engagement with the walls of said ports, each of said retaining members having a peripheral groove at its inward end portion, and a second seal ring disposed in each of said grooves in sealing contact with the cylindrical surface of said plug valve.

4. A valve comprising a chamber having a plurality of fluid ports, a cylindrical plug valve member journaled in said chamber for opening and closing said ports to control the flow of fluid therethrough, and means cooperating with said valve member and chamber for sealing said ports to prevent leakage between said valve member and chamber when the valve member is in its closed position, said means being substantially in the form of an annulus at each side of said valve member and surrounding and of a greater external diameter than said ports, each annulus having a circular groove containing a sealing ring for cooperation with an internal surface of said chamber, a shouldered portion formed from said internal surface on each side of the valve member being abutted by and laterally supporting one side of each annulus, annular sleeves interposed between and adjoining each annulus and the surface of said valve member, and a second sealing means nested between each annulus and annular sleeve and engaging the surface of said valve member for laterally supporting and sealing the other side of each annulus.

5. A valve comprising a chamber having a plurality of fluid ports, a cylindrical plug valve member rotatably journaled in said chamber for opening and closing said ports to control the flow of fluid therethrough, and means cooperating with said valve member and chamber for sealing said ports to prevent leakage between said valve member and chamber when the valve member is in its closed position, said means being in the form of an annulus associated with each port and surrounding and of a greater external diameter than the associated port, each annulus having a circular groove containing a sealing ring for cooperation with the internal surface of said chamber, a shoulder extending from said internal surface on each side of the valve member and abutted by the associated annulus for restraining said annulus from movement laterally in one direction, each annulus having a laterally extending, circular shank portion having a surface adapted to closely fit that of said valve member, a circular sleeve encircling each annulus and having an end surface also closely fitting the cylindrical surface of said valve member, and a second sealing ring associated with each port and encircling the shank portion of each annulus and nested between it and said sleeve and engaging a surface of said valve member, thereby restraining each annulus from lateral movement in the other direction.

6. In a valve structure, a casing having inlet and outlet ports with a rotatable cylindrical plug-type valve member journaled in said casing between said ports, a sealing ring structure in each of said ports including a separate retaining ring for each port having at least two spaced generally parallel resilient seal rings, said retaining rings each having spaced annular pockets each partially defined by an inclined surface, there being one inclined surface for each seal ring, one being inclined for the wedging of one ring against said valve member and the other being inclined for the wedging of the other ring against the inner casing wall about said one opening.

PETER LAWRENCE MIKESKA.

REFERENCES CITED

The following references are of record in the file of this patent:

UNITED STATES PATENTS

| Number | Name | Date |
|---|---|---|
| 743,511 | Huxley | Nov. 10, 1903 |
| 1,027,178 | Caskey | May 21, 1912 |
| 1,879,481 | Putnam | Sept. 27, 1932 |
| 2,337,321 | Freeman | Dec. 21, 1943 |
| 2,375,633 | Downey | May 8, 1945 |
| 2,383,983 | Melichar | Sept. 4, 1945 |
| 2,392,198 | Snyder | Jan. 1, 1946 |
| 2,433,732 | Brown | Dec. 30, 1947 |
| 2,480,529 | Waag | Aug. 30, 1949 |
| 2,503,639 | Snyder | Apr. 11, 1950 |
| 2,533,931 | Hartley | Dec. 12, 1950 |
| 2,578,396 | Brown | Dec. 11, 1951 |